United States Patent [19]

Küppers et al.

[11] 4,218,483

[45] Aug. 19, 1980

[54] CASEIN-BASED DIETETIC FOODSTUFF AND PROCESS FOR ITS PRODUCTION

[75] Inventors: Walter Küppers, Reinheim; Pasquale Della Mura, Darmstadt, both of Fed. Rep. of Germany

[73] Assignee: Merck Patent Gesellschaft mit beschrankter Haftung, Darmstadt, Fed. Rep. of Germany

[21] Appl. No.: 12,788

[22] Filed: Feb. 16, 1979

[30] Foreign Application Priority Data

Feb. 16, 1978 [DE] Fed. Rep. of Germany ....... 2806514

[51] Int. Cl.$^2$ ............................................. A23L 1/30
[52] U.S. Cl. .................................... 426/72; 426/285; 426/656
[58] Field of Search ................. 426/72, 285, 656, 804

[56] References Cited

U.S. PATENT DOCUMENTS

| | | | |
|---|---|---|---|
| 1,962,552 | 6/1934 | Dahlberg | 426/656 X |
| 2,038,633 | 4/1936 | Bienenstock et al. | 426/656 X |
| 3,097,946 | 7/1963 | Menzi et al. | 426/656 X |

*Primary Examiner*—Arthur D. Kellogg
*Attorney, Agent, or Firm*—Millen & White

[57] ABSTRACT

A dietetic foodstuff granulate having a low rate of decomposition in the digestive tract comprises casein and about 0.4–2 weight percent of carob flour based on the weight of dry casein. The particle size is preferably 0.5–5 mm. It is prepared by a process in which casein is made granulatable by addition thereto of the mentioned amount of carob flour and an effective amount of water.

16 Claims, No Drawings

CASEIN-BASED DIETETIC FOODSTUFF AND PROCESS FOR ITS PRODUCTION

BACKGROUND OF THE INVENTION

This invention relates to a casein-based dietetic foodstuff and to a method for its preparation.

The production of a protein concentrate in granulate form from low fat or fat-free edible curds, as well as the use thereof as a dietetic foodstuff, is already known. Such a granulate is normally produced from fresh curds, which are as fat-free as possible, by first mechanically removing a part of the whey and subsequently granulating and drying them. (See, e.g., DAS 1,692,306).

However, the production of these products suffers from numerous difficulties. It is not possible to always obtain a uniformly granular product. Moreover, when the mass obtained after partial removal of the whey is too moist, it cannot be granulated at all since it smears or the overly moist granules stick together. On the other hand, if the material has become too dry, it tends to crumble, whereby, after drying, too high a proportion of dust and fine grains is obtained. Due to such variations in the water content and the varying properties of the curds resulting therefrom, it is difficult to achieve a continuous and reproducible process for granulate production since it is not possible to adjust the water content to constant values by mechanical processes.

Furthermore, the curd starting material is relatively expensive and in some territories, especially in warmer countries, is difficult or even impossible to obtain.

Therefore, attempts have been made to replace the curds partially or completely by casein. However, in these processes, other difficulties arise. Thus, casein alone is difficult to granulate; the granulates obtained are not stable and easily break down to dust after drying. In the stomach, too, such granulates are unstable; their residence time is only about 30 minutes, whereas for the desired dietary purpose, several hours are desired.

A process which employs both curds and casein to obtain a dietetic granulate is also known, i.e., U.S. Application Ser. No. 824,194, filed on Aug. 12, 1977, now U.S. Pat. No. 4,139,642 and its divisional application Ser. No. 952,591 filed on Dec. 22, 1978). Of course, this method suffers from the curd supply problem mentioned above.

SUMMARY OF THE INVENTION

Accordingly, it is an object of this invention to provide a dietetic foodstuff based on casein instead of curds and a process for preparing it, thereby avoiding or at least greatly minimizing the aforementioned disadvantages.

Upon further study of the specification and appended claims, further objects and advantages of this invention will become apparent to those skilled in the art.

These objects have been achieved by providing a dietetic foodstuff granulate having a low rate of decomposition in the digestive tract comprising casein and about 0.4-2 weight percent of carob flour based on the weight of dry casein.

Moreover, these objects have been achieved by providing a process for preparing a dietetic foodstuff granulate which comprises mixing casein with about 0.4 to 2 parts by weight of carob flour, mixing therewith an amount of water effective to permit granulation of the mixture of casein and carob flour; granulating and then drying the mixture.

DETAILED DISCUSSION

It has now been found that a protein granulate useable as a dietetic foodstuff can be produced in a technically simple way which does not suffer from the described disadvantages or which possess them only to a small extent. Instead of curds, as starting material, there is used a mixture of casein and about 0.4 to 2, preferably 0.5 to 0.7 weight percent of carob flour (referred to the amount of dry casein).

Due to the use of carob flour, the granulatability of casein is improved so that, for the first time, there is provided a useful granulate based on casein which possesses the properties desired for a dietetic product, e.g., high nutritional content (protein, etc.), slow digestability, generation of a prolonged feeling of satiation, etc. The particles obtained are especially compact and solid, whereby, surprisingly, their rate of decomposition in the alimentary tract is reduced and the resorption is slowed down. The result is a longer lasting feeling of satisfaction.

The granulate is also thermally stable; thus, after three months storage at temperatures of up to 42° C., the color of the granulate is not changed. An additional advantage of the granulate, in comparison with the known product based on curds, resides in a much reduced susceptibility to microbial contamination. This advantage is especially significant for use in tropical territories.

In a special form, the granules, preferably by drageeing, are provided with a coating which can contain vitamins, mineral materials, trace elements and/or additional active materials.

On a more fundamental basis, the subject of this invention is, furthermore, the discovery that carob flour improves the granulatability of casein.

According to this invention, any desired conventional casein can be used. Preferably, the casein is that which has been obtained by acid precipitation from skimmed milk and generally contains about 8-20, especially about 11-13 weight percent of moisture. Preferably, roller-dried casein is used.

Carob flour which is suitable for use in this invention includes that preferably having viscosities of 20-100 cP in 1% aqueous solution at 25° C.; products of higher viscosity are also, but less well, suited.

Carob flour having such viscosities when added to the appropriate aqueous solutions are readily available commercially.

For the production of the dietetic foodstuff of this invention, the components are first mixed. Expediently, the casein and carob flour are first mixed together in a dry state. An amount of water effective to permit granulation of the carob flour and casein is then added. It can be added all at once or, preferably, in several (e.g., two) portions. The weight of water to be added (exclusive of the moisture in the casein) in general corresponds approximately to the weight of dry casein employed. In general, 80-120 weight percent, preferably 95-105 weight percent, of additional water, based on the weight of dry casein, is to be employed.

Fundamentally, in the overall mixture of casein, carob flour and water, the total amount of water is generally 88–140 weight percent, preferably 103–125 weight percent, based on the weight of dry casein.

It is especially expedient to first mix the powder mixture of casein and carob flour with a comparatively large percentage of the required water at about room temperature. Then a smaller amount of warmed or hot water is added and again mixed. In particular, there can first be added about 50–70 weight percent, referred to the amount of casein, of relatively warm water (15°–25° C.). The mixing procedure is continued. Then, there is added about 50–30 weight percent, referred to the amount of casein, of warmer water (50°–80° C.) and mixing is again continued. The usual conventional intensive mixers can be employed. If an intensive kneader is used, the mixing time can be reduced. Overall, the mixing procedure should not last longer than 90 minutes. An evaporation loss of water has a disadvantageous effect.

It is also possible to distribute additional active materials, especially, e.g., vitamins, minerals and/or trace elements, together with the powdered casein, in the raw mass to be granulated. This option is preferred when the cost- and time-consuming drageeing-on of such active materials is to be avoided. Generally, 3–6 weight percent, based on dry casein, of such additional active ingredients are suitable.

The granulating of the resultant mass can be accomplished in a per se conventional manner to obtain particle sizes of 0.5–5 mm, preferably 1–3 mm. The mixture can be optimally granulated when its moisture content is about 45–50 weight percent. If the moisture content drops too quickly during the mixing and/or granulating, it is advisable to maintain it at the desired level by adding water. Granulation can be effected expediently in two steps, namely, first in a fine granulator and then in a roller granulator to produce granules of the above-mentioned average particle sizes.

Subsequently, the granulated mixture is dried, e.g., in a fluidized bed drier. Preferably, it is first pre-dried at temperatures of 60°–90° C. to a water content of about 15% over a time period of 0.5–2 hours. Then, residual drying, as a rule to a water content of about 6%, is effected at somewhat lower temperatures, e.g., 30°–70° C., over a comparatively long period of time, e.g., 15 hours - 2 days. Because of their low water content and their dry surface which serves as a protective layer, the granules are of almost unlimited storage stability as long as they are properly stored, e.g., under proper relative humidity (e.g., 40–80%) and temperature (e.g., 0°–40° C.).

As a rule, the granulate is obtained in cylindrically shaped particles, whereby the length somewhat exceeds the diameter. Well suited are, e.g., particles having a diameter of 0.5–2 mm and a length of 1.5–5 mm, preferably about 2 mm.

In order to improve its flavor and/or to make its consumption easier, the granulate can also be provided with any desired coating. This advantageously is achieved by drageeing-on a covering in conventional fashion using sugar or sugar substitute materials, or also by other conventional processes, e.g., by spraying.

All conventional materials permitted by the foodstuff laws can be employed in the covering of the granulate. For example, if an enrichment with vitamins, minerals, trace elements or other active materials, or also, with aroma-possessing materials in order to improve the flavor, is desired, these can be incorporated into the coatings. Nutritionally physiologically, especially advantageous is, e.g., a vitamin-containing coating which contains all essential vitamins and/or a protective dragee mantle which gives the granules a smooth surface making its consumption easier.

If, instead of sugar, sugar substitutes, such as sorbitol, xylitol or mannitol, are employed in the production of the dragee mantle, then sweetening material can also be added to increase the sweetening power. In principle, all conventional drageeing coatings suitable for other foodstuffs and pharmaceutical compositions are also useable.

The protein concentrate provided by this invention is an outstanding dietetic foodstuff. It ensures the requirement for protein necessary for life since it contains all essential amino acids. If, by incorporation, drageeing or some other method, vitamins and/or mineral materials are added thereto, it then satisfies the requirements for foodstuffs essential for life. Due to its high protein content and unique type of production, a long-lasting feeling of satisfaction is achieved by the prolonged digestion it undergoes. Because of these facts and because of its low physiological calorific value, this protein concentrate is especially suitable as a reducing food for the overweight and/or obese.

The administration of the new product is analogous to other diet foods, particularly to that of the previously used curd granulates. (See, e.g., U.S. Ser. No. 824,194, filed on Aug. 12, 1977, whose disclosure is incorporated by reference herein). The dosage as a reducing food can be selected as desired in dependence upon its protein content since all component materials are physiologically consumable and readily compatible. For example, conventionally, for a normal adult, about 20–60 g is ingested at one time, 1–3 times daily, e.g., stirred in water, fruit juice, milk or other cold beverage, or sprinkled on food.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(a) 72 kg of casein (water content 12.3%; corresponding to 63.16 kg of dry substance) and 0.36 kg of carob flour (viscosity of a 1% aqueous solution at 25° C.: 30–50 cP) are intensively mixed for 15 minutes. 45 liters of water at a temperature of about 20° C. are poured into the mixture. Mixing is conducted for an additional 15 minutes. Subsequently, 18 liters of water, warmed to about 60°–70° C., are added thereto. Mixing continues for a further 5 minutes. Granulation is performed in two stages: first in a fine granulator (sieve insert 3 mm $\phi$), then in a roller granulator (wall thickness 7.5 mm; cylindrical bore 2.0 or 2.2 mm; granulation length 150 mm). The granulate is dried for 90 minutes at 70° C. and then separated from fine material via sieve 4 (49 meshes/cm$^2$). 90 kg of a yellowish-white crude granulate are obtained in the form of cylindrically-shaped granules with a diameter of about 1.8 mm and a length of about 3 mm (bulk density: at least 50 g/100 ml; drying loss after 3 hours heating to 105° C.: about 5%).

(b) The granulate (90 kg) is subsequently drageed in a drageeing kettle. First, 6 applications are made, each with 3330 ml of sugar syrup (density 1.32; containing 67 weight percent of cane sugar). In each case, shortly before sticking, 0.850 kg of cane is sprinkled in. The seventh application additionally contains 60 g of vanillin. For the 8th application, 262.5 g of gelatine are dissolved in 1.5 liters of water at 40° C.; 1.040 kg of cane sugar are aded thereto; the resultant solution is used in the dragee operation. Subsequently, the coated granulate is dried for 15 to 20 minutes in the kettle with warm air at 70° C., and post-dried overnight at 35° C. on hurdles at a layer height of 8–10 cm. Subsequently, the product is freed from fine material via a sieve with a 6 mm mesh width. 117 to 120 kg of drageed granulate having a water content of about 5.0 to 7.5% is obtained.

After oral administration of the product so obtained, the proportion of undigested protein is after two hours, 41.4% and after four hours, 28.5% of the total protein.

EXAMPLE 2

(a) The method of Example 1a is employed but 96 kg of casein, 73.8 kg of total water and 1.68 kg of carob flour are used to obtain 120 kg of crude granulate.

(b) 120 kg of the so-obtained crude granulate are moistened in a drageeing kettle with about 4 liters of drageeing syrup DAB 7. Shortly before sticking occurs, about 1 kg of cane sugar is sprinkled in and the mixture is blown dry. Thereafter, 5 liter amounts of a vitamin-containing drageeing syrup are applied in five applications. The vitamins are so dosed that for about 20 g of protein in the final product, there are the following amounts of vitamins:

| | |
|---|---|
| vitamin A | 1235 I.U. |
| vitamin E | 7.5 mg |
| vitamin $B_1$ | 0.3 mg |
| vitamin $B_2$ | 0.5 mg |
| vitamin $B_6$ | 0.5 mg |
| vitamin $B_{12}$ | 1.3 μg |
| niacinamide | 3.3 mg |
| calcium D-pantothenate | 2.6 mg |
| folic acid | 0.1 mg |

In each case, the batch is mixed well and dried. Subsequently, a layer is applied in two applications, each of 3.2 liters of sugar syrup and in each case about 1.3 kg of cane sugar is sprinkled in.

For aromatization, if desired, in a third application about 80 g of vanillin are added thereto. The final granulate is post-dried.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A dietetic foodstuff granulate having a low rate of decomposition in the digestive tract comprising casein and about 0.4–2 weight percent of carob flour based on the weight of dry casein.

2. The dietetic foodstuff granulate of claim 1 having a particle size of 0.5–5 mm.

3. The dietetic foodstuff granulate of claim 1, further comprising a coating on the granules.

4. The dietetic foodstuff granulate of claim 3, wherein the coating contains an additional active ingredient or a sweetener.

5. The dietetic foodstuff granulate of claim 4, containing a vitamin as an additional active ingredient.

6. The dietetic foodstuff granulate of claim 2, which further comprises an additional active ingredient.

7. A process for preparing a dietetic foodstuff granulate, which comprises mixing casein with about 0.4 to 2 parts by weight of carob flour based on the weight of dry casein; mixing therewith an amount of water effective to permit granulation of the mixture of casein and carob flour; granulating and then drying the mixture.

8. The process of claim 7, wherein the weight of water is about the same as the weight of casein on a dry basis.

9. The process of claim 7, wherein granules having a particle size of 0.5–5 mm are produced.

10. The process of claim 7, which further comprises coating the granules with a vitamin-containing or a drageeing mantle.

11. A method of suppressing appetite which comprises ingesting an amount of a dry mixture of casein and about 0.4–2 weight percent, based on the dry weight of casein, of carob flour, effective to suppress appetite.

12. The method of claim 11, wherein the dietetic foodstuff comprises granules having a particle size of 0.5–5 mm.

13. The dietetic foodstuff of claim 2 in a unit dosage form of about 20–60 g.

14. A method of granulating casein which comprises adding thereto 0.4–2 wt.% of carob flour, the amount added being effective to render the casein granulatable, mixing therewith an amount of water effective to permit granulation of the mixture of casein and carob flour, and subsequently granulating the mixture of casein and carob flour.

15. A mixture, granulatable upon the addition of water, comprising casein and 0.4–2 wt.% of carob flour, said amount being effective to render the casein granulatable upon the addition of an amount of water effective to permit granulation.

16. A dietetic foodstuff granulate prepared by the process of claim 7.

* * * * *